United States Patent
Chun et al.

(10) Patent No.: US 8,399,567 B2
(45) Date of Patent: Mar. 19, 2013

(54) OPTICAL FILM AND LIQUID CRYSTAL DISPLAY DEVICE COMPRISING THE SAME

(75) Inventors: Byoung-Kyu Chun, Daejeon (KR); Su-Kyung Kim, Daejeon (KR); Da-Eun Sung, Daejeon (KR); Byoung-Il Kang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/142,382

(22) PCT Filed: Dec. 30, 2009

(86) PCT No.: PCT/KR2009/007934
§ 371 (c)(1),
(2), (4) Date: Jun. 27, 2011

(87) PCT Pub. No.: WO2010/079920
PCT Pub. Date: Jul. 15, 2010

(65) Prior Publication Data
US 2011/0269910 A1  Nov. 3, 2011

(30) Foreign Application Priority Data
Jan. 6, 2009  (KR) ........................ 10-2009-0000765

(51) Int. Cl.
G02B 5/30 (2006.01)
G02F 1/1335 (2006.01)
C08J 15/18 (2006.01)
B29C 55/02 (2006.01)

(52) U.S. Cl. ......... 525/216; 525/221; 525/222; 525/241

(58) Field of Classification Search .................. 525/216, 525/221, 222, 241
See application file for complete search history.

(56) References Cited

U.S. PATENT DOCUMENTS

| | | | |
|---|---|---|---|
| 5,189,100 A * | 2/1993 | Fischer et al. | .................. 525/74 |
| 2006/0008642 A1 | 1/2006 | Marot et al. | |
| 2006/0234074 A1 | 10/2006 | Yun et al. | |
| 2011/0297896 A1 * | 12/2011 | Kim et al. | ..................... 252/585 |

FOREIGN PATENT DOCUMENTS

| | | |
|---|---|---|
| CN | 1657283 A | 8/2005 |
| CN | 1993440 A | 7/2007 |
| EP | 0 374 118 A2 | 6/1990 |
| JP | 9-281333 A | 10/1997 |
| JP | 2006-143758 | 6/2006 |
| JP | 2006-215463 | 8/2006 |
| JP | 2006-215465 | 8/2006 |
| JP | 2006-243681 | 10/2006 |
| JP | 2006-284881 | 10/2006 |
| JP | 2006-284882 | 10/2006 |
| JP | 2007-017555 | 1/2007 |
| JP | 2007-256475 A | 10/2007 |
| JP | 2008-262182 A | 10/2008 |
| KR | 95-0013363 | 11/1995 |
| KR | 10-2008-0004720 A | 1/2008 |
| KR | 2008-0061813 | 7/2008 |
| KR | 2008-0103203 | 11/2008 |

* cited by examiner

*Primary Examiner* — Nathan M Nutter
(74) *Attorney, Agent, or Firm* — McKenna Long & Aldridge, LLP

(57) ABSTRACT

The present invention relates to an optical film comprising: a blended resin including 1) an acrylic copolymer resin containing an alkyl methacrylate monomer and a (metha) acrylic monomer containing an alicyclic or an aromatic ring, 2) a copolymer resin containing an alkyl methacrylate monomer, an aromatic vinyl monomer, and an acid anhydride monomer, and 3) a resin containing an aromatic or an alicyclic ring in the main chain of a polymer. The present invention also relates to a method for manufacturing the optical film, and a liquid crystal display device comprising the optical film. The optical film according to the present invention is excellent in heat resistance, optical transparency, mechanical strength, durability, and the like.

18 Claims, No Drawings

OPTICAL FILM AND LIQUID CRYSTAL DISPLAY DEVICE COMPRISING THE SAME

This application is a National Stage Entry of International Application No. PCT/KR2009/007934, filed Dec. 30, 2009, and claims the benefit of Korean Application No. 10-2009-0000765, filed on Jan. 6, 2009, which is hereby incorporated by reference for all purposes as if fully set forth herein.

TECHNICAL FIELD

The present invention relates to an optical film having superior heat-resistance properties and optical transparency, low hazing and impact resistance properties, and excellent mechanical strength, a method of manufacturing the same, and a liquid crystal display device including the same.

BACKGROUND ART

Recently, based on the development of optical technology, display devices using various schemes replacing a Braun tube in the related art, such as a plasma display panel (PDP), a liquid crystal display (LCD), or the like have been proposed and have come into the market. The characteristics required for a polymer material used in these displays have been further enhanced. For example, in the case of an LCD, as thinning, weight reduction and increases in screen area have been undertaken, in particular, a widened viewing angle, a high contrast, the control of image color change due to an viewing angle, and a uniform screen display have become important.

Accordingly, various polymer films have been used for a polarizing film, a polarizer protective film, a retardation film, a plastic film, a light guiding plate, and like. Various modes of liquid crystal display using twisted nematic (TN), super twisted nematic (STN), vertical alignment (VA), and in-plane switching (IPS) liquid crystal cells, as liquid crystals, have been developed. Since all of the liquid crystal cells have a unique liquid crystal arrangement, they have unique optical anisotropy. In order to compensate for optical anisotropy, a film having a phase difference function provided by stretching various kinds of polymers has been proposed.

A polarizing plate generally has a structure in which a triacetyl cellulose film (hereinafter, referred to as TAC film) as a protective film is stacked on a polarizer by using water-based adhesive made of polyvinyl alcohol solution. However, neither a polyvinyl alcohol film used as a polarizer nor a TAC film used as a polarizer protective film have sufficient heat and humidity resistance properties. Accordingly, when a polarizing plate made of these films is used in a high temperature or high humidity atmosphere for an extended period of time, there are various limitations in terms of the uses thereof because polarization may be degraded, the polarizer may be separated from the protective film or optical properties may be deteriorated.

In addition, a TAC film has serious changes in an existing in-plane phase difference $R_{in}$ and a thickness direction phase difference $R_{th}$ according to ambient temperature/humidity, and in particular, has a significant change in phase difference with respect to incident light in a dip direction. When a polarizing plate including the TAC film having such characteristics as a protective film is applied to a liquid crystal display, viewing angle properties are varied according to changes in ambient temperature/humidity circumstances to thereby cause the degradation of image quality. Furthermore, since TAC film has a relatively large photoelastic coefficient value, as well as a large dimensional change rate according to the changes in ambient temperature/humidity circumstances, it may have local changes in phase difference properties generated after durability evaluation in heat-resistant, humidity-resistive circumstances, whereby image quality may tend to be deteriorated.

As a material compensating for several disadvantages of the TAC film, a methacrylate-based resin is well known. However, since the methacrylate-based resin may tend to be fragile and easily cracked, it is known that the methacrylate-based resin has limitations in terms of conveyance and productivity at the time of the manufacturing of a polarizing plate.

In order to solve these defects, methods of blending other resins or a tough conditioner into an acrylic resin (Japanese Patent Laid-Open Publication No. 2006-284881 and Japanese Patent Laid-Open Publication No. 2006-284882), or methods of co-extruding and stacking other resins (Japanese Patent Laid-Open Publication No. 2006-243681, Japanese Patent Laid-Open Publication No. 2006-215463, Japanese Patent Laid-Open Publication No. 2006-215465, and Japanese Patent Laid-Open Publication No. 2007-017555) have been proposed. However, these methods have limitations in that inherent high heat-resistance and high transparency of the acrylic resin are not sufficiently reflected therein or that the acrylic resin has a complex laminate structure.

DISCLOSURE

Technical Problem

An aspect of the present invention provides an optical film capable of being used for manufacturing a film having superior optical transparency, as well as superior optical characteristics, solving the disadvantage of fragility in an acrylic film and having excellent processability, heat resistance properties and durability.

An aspect of the present invention also provides a method of manufacturing the optical film and a liquid crystal display including the optical film.

Technical Solution

According to an aspect of the present invention, there is provided an optical film, including: a blended resin including 1) an acrylic copolymer resin containing an alkyl methacrylate monomer and a (metha) acrylic monomer containing an alicyclic or an aromatic ring, 2) a copolymer resin containing an alkyl methacrylate monomer, an aromatic vinyl monomer, and an acid anhydride monomer, and 3) a resin containing an aromatic or an alicyclic ring in a main chain of a polymer.

According to another aspect of the present invention, there is provided a method of manufacturing an optical film, the method comprising: 1) preparing a blended resin composition including a) an acrylic copolymer resin containing an alkyl methacrylate monomer and a (metha) acrylic monomer containing an alicyclic or an aromatic ring, b) a copolymer resin containing an alkyl methacrylate monomer, an aromatic vinyl monomer, and an acid anhydride monomer, and c) a resin containing an aromatic or an alicyclic ring in a main chain of a polymer; 2) forming a film by using the blended resin composition. The method may further include uniaxially or biaxially stretching the film.

According to another aspect of the invention, the invention provides a liquid crystal display including at least one of the optical film.

Advantageous Effects

An optical film according to the present invention may have superior optical transparency and superior optical characteristics, as well as excellent mechanical properties, processability, heat-resistance properties, phase difference characteristics and durability.

BEST MODE OF INVENTION

An optical film according to the present invention may include a blended resin, including 1) an acrylic copolymer resin containing an alkyl methacrylate monomer and a (metha) acrylic monomer containing an alicyclic or an aromatic ring, 2) a copolymer resin containing an alkyl methacrylate monomer, an aromatic vinyl monomer, and an acid anhydride monomer, and 3) a resin containing an aromatic or an alicyclic ring in a main chain of a polymer.

In the optical film according to the present invention, an alkyl group of the alkyl methacrylate monomer may have 1 to 10 carbon atoms, more preferably 1 to 4 carbon atoms, and may be a methyl group or ethyl group.

The alkyl methacrylate monomer may be, for example, methyl methacrylate, ethyl methacrylate, or the like, and more preferably, methyl methacrylate; however, it is not limited thereto.

In the optical film according to the present invention, a (metha) acrylic monomer having heat resistance properties may be used as the (metha) acrylic monomer containing an alicyclic or an aromatic ring contained in the acrylic copolymer resin. More specifically, the (metha) acrylic monomer may include cyclohexyl methacrylate, benzyl methacrylate, cyclohexyl acrylate, 2-phenoxyethyl acrylate, 3,3,5-trimethylcyclohexyl methacrylate, phenyl methacrylate, naphthyl methacrylate, or the like, and more preferably, cyclohexyl methacrylate; however it is not limited thereto.

The optical film according to the present invention may include the (metha) acrylic monomer containing an alicyclic or an aromatic ring in the acrylic copolymer resin, whereby the heat-resistance properties of the acrylic copolymer resin may be increased.

In the optical film according to the present invention, the contents of the alkyl methacrylate monomer and the (metha) acrylic monomer containing an alicyclic or an aromatic ring contained in the acrylic copolymer resin may be respectively selected within the range of 0.1 to 99.9% by weight. In particular, the content of the alkyl methacrylate monomer may be 60 to 99.9% by weight, while the content of the (metha) acrylic monomer containing an alicyclic or an aromatic ring may be 0.1 to 40% by weight; however, the present invention is not limited thereto.

In the optical film according to the present invention, the acrylic copolymer resin may further include at least one comonomer selected from the group consisting of alpha-methylstyrene and maleimide monomers.

The maleimide monomer may include phenylmaleimide, cyclohexylmaleimide, or the like; however, it is not limited thereto.

The content of alpha-methylstyrene or maleimide monomer contained in the acrylic copolymer resin may be 0.1 to 40% by weight; however, it is not limited thereto.

The optical film according to the present invention may include alpha-methylstyrene or maleimide monomer in the acrylic copolymer resin, whereby the heat-resistance properties of the acrylic copolymer resin may be increased.

In the optical film according to the present invention, a monomer having a structure in which a benzene nucleus is substituted or unsubstituted with one or more $C_1$ to $C_5$ alkyl group or a halogen group may be used as the aromatic vinyl monomer contained in the copolymer resin. For example, the monomer may be at least a styrene monomer selected from the group consisting of styrene, α-methyl styrene, p-methyl styrene, vinyl toluene, and the like.

A carboxylic acid anhydride may be used for the acid anhydride monomer contained in the copolymer resin, and a monovalent or at least divalent, polyvalent carboxylic acid anhydride may be used therefor. Preferably, a maleic anhydride or a derivative thereof may be used.

In the copolymer resin, the content of the alkyl methacrylate monomer may be 50 to 90% by weight, the content of the aromatic vinyl monomer may be 9 to 40% by weight, and the content of the acid anhydride monomer may be 1 to 15% by weight.

More preferably, the copolymer resin may be a methyl methacrylate-styrene-maleic anhydride copolymer. A polymer in a random form may be advantageous, rather than in a block form, in order to realize uniform mechanical properties.

The optical film according to the present invention may include the copolymer resin containing the alkyl methacrylate monomer, the aromatic vinyl monomer, and the acid anhydride monomer, whereby adhesive properties and heat-resistance properties of the optical film may be increased.

In the optical film according to the present invention, a polycarbonate resin, a polyarylate resin, a polynaphthalene resin, a polynorbornene resin, or the like may be used as the resin containing an aromatic or an alicyclic ring in the main chain of the polymer. More particularly, the resin may be a polycarbonate resin; however, it is not limited thereto.

In the optical film according to the present invention, the content of the acrylic copolymer resin 1) may be 80% or more by weight and less than 100% by weight, the content of the copolymer resin 2) may be greater than 0% by weight and 20% or less by weight, and the content of the resin 3) containing an aromatic or an alicyclic ring in the main chain of the polymer may be greater than 0% by weight and 20% or less by weight, in the blended resin. More particularly, in the blended resin, the content of the acrylic copolymer resin 1) may be 85% or more by weight and less than 100% by weight, the content of the copolymer resin 2) may be greater than 0% by weight and 15% or less by weight, and the content of the resin 3) containing an aromatic or an alicyclic ring in the main chain of the polymer may be greater than 0% by weight and 15% or less by weight.

In the optical film according to the present invention, the glass transition temperature of the blended resin may be 110 or more, more preferably 120 or more. In addition, the weight average molecule weight of the blended resin may be 50,000 to 200,000, in terms of heat resistance, sufficient processability, productivity, or the like.

The optical film according to the present invention may have a plane direction phase difference value of −5 to nm as indicated in the following Equation 1, and a thickness direction phase difference value of −5 to 5 nm as indicated in the following Equation 2, $$R_{in}=(n_x-n_y)\times d \qquad \text{[Equation 1]}$$

$$R_{th}=(n_z-n_y)\times d \qquad \text{[Equation 2]}$$

in Equation 1 and Equation 2, where $n_x$ is the maximum refractive index in a plane direction of the optical film, $n_y$ is a refractive index in a direction of the optical film perpendicular to the direction of $n_x$, $n_z$ is a refractive index in a thickness direction, and d is the thickness of the film.

The optical film according to the present invention may be used as a polarizer protective film. When the optical film according to the present invention is used as the polarizer protective film, the polarizer protective film may have excellent transparency, optical properties, mechanical strength, or the like, and in particular, may have heat-resistance properties.

Furthermore, a method of manufacturing the optical film according to the present invention may include 1) preparing a blended resin composition including a) an acrylic copolymer resin containing an alkyl methacrylate monomer and a (metha) acrylic monomer containing an alicyclic or an aromatic ring, b) a copolymer resin containing an alkyl methacrylate monomer, an aromatic vinyl monomer, and an acid anhydride monomer, and c) a resin containing an aromatic or an alicyclic ring in the main chain of a polymer; and, 2) forming a film by using the blended resin composition. The method of manufacturing the optical film may further include uniaxially or biaxially stretching the film.

The concrete descriptions of the acrylic copolymer resin, the copolymer resin containing an alkyl methacrylate monomer, an aromatic vinyl monomer, and an acid anhydride monomer, and the resin containing an aromatic or an alicyclic ring in the main chain of the polymer are the same as previously described, and therefore a detailed description thereof will be omitted.

In the method of manufacturing the optical film according to the present invention, the resin composition may be prepared by melt mixing and blending the above-mentioned constituents. The melt mixing of the constituents may be performed by using a liquid casting method, an extrusion method, or the like.

In the method of manufacturing the optical film according to the present invention, a film may be manufactured through a liquid casting method, and then the film may be subjected to a stretching process.

In addition, in some cases, the extrusion method may be undertaken through the addition of a conditioner.

The resin composition may further include an antioxidant, a UV stabilizer, a heat stabilizer, or the like, which is generally used in the related art.

The method of manufacturing the optical film according to the present invention may further include uniaxially or biaxially stretching the film. The stretching process may be performed by either a longitudinal (MD) stretching or a transverse (TD) stretching method, or both longitudinal and transverse stretching methods. In the case of performing both longitudinal and transverse stretching methods, after stretching in one direction, stretching in the other direction may be undertaken. Stretching in both directions may also be simultaneously undertaken. The stretching may be performed as a single step process, and may also be performed as a multistep process. In the case of the longitudinal stretching method, stretching may be performed by the velocity difference between rolls. In the case of the transverse stretching method, a tenter may be used. The initial rail angle of the tenter may be 10 degrees or less, whereby a bowing phenomenon generated at the time of the transverse stretching may be inhibited and the angle of an optical axis may be regularly controlled. The transverse stretching method may be performed through a multistep process to thereby prevent the occurrence of the bowing phenomenon.

Given that the glass transition temperature of the resin composition refers to Tg, stretching may be performed at a temperature of (Tg−20° C.) to (Tg+30° C.) The glass transition temperature may refer to a temperature area between a temperature at which the storage modulus of the resin composition starts to be lowered and consequently the loss modulus thereof becomes greater than the storage modulus, and a temperature at which the orientation of a polymer chain may be reduced and lost. The glass transition temperature may be measured by a differential scanning calorimeter (DSC). More preferably, a temperature at the time of the stretching process may be the glass transition temperature of the film.

In the case of a small stretching machine (Universal testing machine, Zwick Z010), a stretching operation may be undertaken at a stretching rate in the range of 1 to 100 mm/min. In the case of a pilot stretching equipment, a stretching operation may be undertaken at a stretching rate in the range of 0.1 to 2 m/min. The film may be stretched through the application of an elongation of 5 to 300%.

The optical film according to the present invention may be uniaxially or biaxially stretched by the above described methods, whereby phase difference characteristics thereof may be adjusted.

Also, according to the present invention, in a liquid crystal display including at least one optical film, the optical film may be as described above.

For example, according to the present invention, there is provided a liquid crystal display including a light source, a first polarizing plate, a liquid crystal cell, and a second polarizing plate sequentially stacked therein, and including the optical film according to the present invention as a protective film of at least one of the first polarizing plate and second polarizing plate.

The liquid crystal cell may include a liquid crystal layer; a substrate supporting the liquid crystal layer; and an electrode layer for applying voltage to the liquid crystal cell. In this case, the polarizing plates according to the present invention may be applied to various liquid crystal modes, such as an in-plane switching mode (IPS mode), a vertically aligned mode (VA mode), an optically compensated birefringence mode (OCB mode), a twisted nematic mode (TN mode), a fringe field switching mode (FFS mode) and the like.

The optical film according to the present invention may be provided on both faces of a polarizer. In addition, one surface of the polarizer may be provided with the optical film, and the other surface of the polarizer may be provided with a polarizer protective film, such as a TAC film, a PET film, a COP film, a PC film, a polynorbornene film or the like, which is well known in the related art.

The adhesion of the polarizer and the optical film may be performed by using an adhesive layer. An adhesive agent used at the time of adhering the optical film and the polarizing plate is not particularly limited, so long as it is well known in the related art. For example, as the adhesive agent, a one-component type or a two-component type polyvinyl alcohol (PVA), polyurethane, epoxy, or styrene butadiene rubber (SBR) adhesive agent, a hot melt type adhesive agent, or the like may be used; however, the adhesive agent is not limited thereto. More preferably, as the adhesive agent, a polyvinyl alcohol adhesive agent may be used.

The adhesion of the polarizer and the optical film may be performed by coating an adhesive agent on a polarizer protective film or a PVA (which is a polarizer) film through the use of a roll coater, a gravure coater, a bar coater, a knife coater, a capillary recorder or the like, and heat-pressing or cold-pressing the protective film and the polarizer film by using an adhering roll to thereby adhere the protective film and the polarizer film. In the case of using the hot melt type adhesive agent, the use of a heat-pressing roller may be required.

In the case of using a polyurethane adhesive agent, a polyurethane adhesive agent manufactured by using an aliphatic isocyanate compound which is not yellowed by light may be used. In the case of using a one-component type or two-component type adhesive agent for a dry laminate, or an adhesive agent having a relatively low reactivity with isocyanate and a hydroxy-group, a liquid type adhesive agent diluted with an acetate solvent, a ketone solvent, an ether solvent, an aromatic solvent, or the like may be used. In this case, the viscosity of the adhesive agent may be low, such as 5,000 cps or less. The adhesive agent may have excellent storage stability and, preferably, optical transmittance of 90% or more at 400~800 nm.

A gluing agent may be used, as long as it provides sufficient glutinousness. The gluing agent may be sufficiently cured by heat or ultra violet light after adhesion thereof to have mechanical strength enhanced to the level of that of an adhesive agent. The gluing agent may have an amount of interfacial adhesion to a degree such that the gluing agent may not be exfoliated without breaking either of both films having gluing agent adhered thereto.

A usable gluing agent may include, for example, raw rubber, synthetic rubber, or elastomer having superior optical transparency, a vinyl acetate/vinyl chloride copolymer, polyvinyl alkyl ether, polyacrylate, modified polyolefin-based gluing agent and a curable gluing agent having a hardener, such as isocyanate, added therein.

MODE FOR INVENTION

The present invention will be explained in more detail through Examples; however, the Examples may be provided by way of example and should not be construed as limiting the scope of the present invention.

EXAMPLE

Example 1

A resin including 94 parts by weight of a copolymer resin containing methyl methacrylate (90 parts by weight), and cyclohexyl methacrylate (10 parts by weight), 4 parts by weight of a copolymer resin containing methyl methacrylate (68 parts by weight), styrene (23 parts by weight), and maleic anhydride (9 parts by weight), and 2 parts by weight of a polycarbonate was manufactured. As a result of measuring the glass transition temperature and the weight average molecular weight of the manufactured resin, a resin having a glass transition temperature of 123 and a weight average molecular weight of 100,000 was obtained. A film was manufactured through an extrusion method by using the resin, and then subjected to stretching at the glass transition temperature. Thereafter, the phase difference value of the film was measured. As a result, a plane direction phase difference value/a thickness direction phase difference value was 2.5 nm/3 nm.

Example 2

A resin including 93 parts by weight of a copolymer resin containing methyl methacrylate (90 parts by weight), and cyclohexyl methacrylate (10 parts by weight), 4 parts by weight of a copolymer resin containing methyl methacrylate (68 parts by weight), styrene (23 parts by weight), and maleic anhydride (9 parts by weight), and 3 parts by weight of a polycarbonate was manufactured. As a result of measuring the glass transition temperature and the weight average molecular weight of the manufactured resin, a resin having a glass transition temperature of 123° C. and a weight average molecular weight of 100,000 was obtained. A film was manufactured through an extrusion method by using the resin, and then subjected to stretching at the glass transition temperature. Thereafter, the phase difference value of the film was measured. As a result, a plane direction phase difference value/a thickness direction phase difference value was 2.3 nm/0.5 nm.

Example 3

A resin including 95.5 parts by weight of a copolymer resin containing methyl methacrylate (87.5 parts by weight), cyclohexyl methacrylate (10 parts by weight), and phenylmaleimide (1.5 parts by weight), 2.5 parts by weight of a copolymer resin containing methyl methacrylate (68 parts by weight), styrene (23 parts by weight), and maleic anhydride (9 parts by weight), and 2 parts by weight of a polycarbonate was manufactured. As a result of measuring the glass transition temperature and the weight average molecular weight of the manufactured resin, a resin having a glass transition temperature of 124° C. and a weight average molecular weight of 100,000 was obtained. A film was manufactured through an extrusion method by using the resin, and then subjected to stretching at the glass transition temperature. Thereafter, the phase difference value of the film was measured. As a result, a plane direction phase difference value/a thickness direction phase difference value was 0.1 nm/0.5 nm.

Example 4

A resin including 95.5 parts by weight of a copolymer resin containing methyl methacrylate (88 parts by weight), cyclohexyl methacrylate (10 parts by weight), and phenylmaleimide (2 parts by weight), 2.5 parts by weight of a copolymer resin containing methyl methacrylate (68 parts by weight), styrene (23 parts by weight), and maleic anhydride (9 parts by weight), and 2 parts by weight of a polycarbonate was manufactured. As a result of measuring the glass transition temperature and the weight average molecular weight of the manufactured resin, a resin having a glass transition temperature of 124° C. and a weight average molecular weight of 110,000 was obtained. A film was manufactured through an extrusion method by using the resin, and then subjected to stretching at the glass transition temperature. Thereafter, the phase difference value of the film was measured. As a result, a plane direction phase difference value/a thickness direction phase difference value was 0.1 nm/0.5 nm.

Comparative Example 1

A resin including 87 parts by weight of a copolymer resin containing methyl methacrylate (90 parts by weight), and cyclohexyl methacrylate (10 parts by weight), 3 parts by weight of a copolymer resin containing methyl methacrylate (80 parts by weight), styrene (15 parts by weight), and maleic anhydride (5 parts by weight), and 10 parts by weight of a polycarbonate was manufactured. As a result of measuring the glass transition temperature and the weight average molecular weight of the manufactured resin, a resin having a glass transition temperature of 126° C. and a weight average molecular weight of 110,000 was obtained. A film was manufactured through a liquid casting method by using the resin, and then subjected to stretching at the glass transition temperature. Thereafter, the phase difference value of the film was measured. As a result, a plane direction phase difference value/a thickness direction phase difference value was 103 nm/−78 nm.

Comparative Example 2

A resin including 86 parts by weight of a copolymer resin containing methyl methacrylate (90 parts by weight), and cyclohexyl methacrylate (10 parts by weight), 4 parts by weight of a copolymer resin containing methyl methacrylate (80 parts by weight), styrene (15 parts by weight), and maleic anhydride (5 parts by weight), and 10 parts by weight of a polycarbonate was manufactured. As a result of measuring the glass transition temperature and the weight average molecular weight of the manufactured resin, a resin having a glass transition temperature of 126° C. and a weight average molecular weight of 110,000 was obtained. A film was manufactured through a liquid casting method by using the resin, and then subjected to stretching at the glass transition temperature. Thereafter, the phase difference value of the film was measured. As a result, a plane direction phase difference value/a thickness direction phase difference value was 67 nm/−76 nm.

The content of the blended resin, the characteristics of the optical film or the like according to the Examples 1 to 4 and the Comparative Examples 1 to 2 are shown in the following tables 1 and 2.

TABLE 1

|  | Acrylic copolymer |  | MMA-SM-MAH | PC |
| --- | --- | --- | --- | --- |
|  | Monomer | Parts by weight | (Parts by weight) | (Parts by weight) |
| Example 1 | MMA (90) CHMA (10) | 94 | 4 | 2 |
| Example 2 | MMA (90) CHMA (10) | 93 | 4 | 3 |
| Example 3 | MMA (87.5) CHMA (10) PMI (1.5) | 95.5 | 2.5 | 2 |
| Example 4 | MMA (88) CHMA (10) PMI (2) | 95.5 | 2.5 | 2 |
| Comparative Example 1 | MMA (90) CHMA (10) | 87 | 3 | 10 |
| Comparative Example 2 | MMA (90) CHMA (10) | 86 | 4 | 10 |

MMA: methyl methacrylate
CHMA: cyclohexyl methacrylate
PMI: phenyl methacrylate
MMA-SM-MAH: methyl methacrylate-styrene-maleic anhydride copolymer
PC: polycarbonate

TABLE 2

|  | Miscibility | Tg (° C.) | Mw | $R_{in}$ (nm) | $R_{th}$ (nm) |
| --- | --- | --- | --- | --- | --- |
| Example 1 | ○ | 123 | 100,000 | 2.5 | 3 |
| Example 2 | ○ | 123 | 100,000 | 2.3 | 0.5 |
| Example 3 | ○ | 124 | 100,000 | 0.1 | 0.5 |
| Example 4 | ○ | 125 | 110,000 | 0.3 | 0.7 |
| Comparative Example 1 | ○ | 125 | 110,000 | 103 | −78 |
| Comparative Example 2 | ○ | 126 | 110,000 | 67 | −76 |

(1) Weight average molecular weight (Mw): measured through gel permeation chromatography (GPC) by melting the manufactured resin into tetrahydrofuran.
(2) Glass transition temperature (Tg): measured by using a differential scanning calorimeter (DSC) of TA Instrument.
(3) Phase difference value ($R_{in}$/$R_{th}$): measured by using an AxoScan of Axometrics, after stretching the film at the glass transition temperature.

From the results of the tables 1 and 2, it can be seen that the optical film according to the present invention have superior optical transparency and superior optical characteristic, as well as excellent mechanical properties, processability, heat-resistance properties, phase difference characteristics, and durability.

The invention claimed is:

1. An optical film, comprising: a blended resin including 1) an acrylic copolymer resin containing an alkyl methacrylate monomer and a (meth)acrylic monomer containing an alicyclic or an aromatic ring, 2) a copolymer resin containing an alkyl methacrylate monomer, an aromatic vinyl monomer, and an acid anhydride monomer, and 3) a resin containing an aromatic or an alicyclic ring in a main chain of a polymer.

2. The optical film of claim 1, wherein the alkyl methacrylate monomer is methyl methacrylate or ethyl methacrylate.

3. The optical film of claim 1, wherein the (meth)acrylic monomer containing an alicyclic or an aromatic ring contained in 1) the acrylic copolymer resin includes at least one selected from a group consisting of cyclohexyl methacrylate, benzyl methacrylate, cyclohexyl acrylate, 2-phenoxyethyl acrylate, 3,3,5-trimethylcyclohexyl methacrylate, phenyl methacrylate, and naphthyl methacrylate.

4. The optical film of claim 1, wherein 1) the acrylic copolymer resin further includes at least one comonomer selected from a group consisting of an alpha-methylstyrene monomer and a maleimide monomer.

5. The optical film of claim 4, wherein the alpha-methylstyrene or maleimide monomer contained in 1) the acrylic copolymer resin has a content of 0.1 to 40% by weight.

6. The optical film of claim 1, wherein the aromatic vinyl monomer contained in 2) the copolymer resin includes at least one selected from a group consisting of styrene, α-methyl styrene, p-methyl styrene, and vinyl toluene.

7. The optical film of claim 1, wherein the acid anhydride monomer contained in 2) the copolymer resin includes a carboxylic acid anhydride.

8. The optical film of claim 1, wherein in 2) the copolymer resin, the alkyl methacrylate monomer has a content of 50 to 90% by weight, the aromatic vinyl monomer has a content of 9 to 40% by weight, and the acid anhydride monomer has a content of 1 to 15% by weight.

9. The optical film of claim 1, wherein 2) the copolymer resin is a methyl methacrylate-styrene-maleic anhydride copolymer.

10. The optical film of claim 1, wherein 3) the resin containing an aromatic or an alicyclic ring in the main chain of the polymer includes at least one selected from a group consisting of a polycarbonate resin, a polyarylate resin, a polynaphthalene resin, and a polynorbornene resin.

11. The optical film of claim 1, wherein in the blended resin, 1) the acrylic copolymer resin has a content of 80% or more by weight and less than 100% by weight, 2) the copolymer resin has a content greater than 0% by weight and 20% or less by weight, and 3) the resin containing an aromatic or an alicyclic ring in the main chain of the polymer has a content greater than 0% by weight and 20% or less by weight.

12. The optical film of claim 1, wherein the blended resin has a glass transition temperature of 110° C. or more.

13. The optical film of claim 1, wherein the blended resin has a weight average molecular weight in a range of 50,000 to 200,000.

14. The optical film of claim 1, characterized in that the optical film has a plane direction phase-difference value of −5 to 5 nm as indicated in the following Equation 1 and a thickness direction phase-difference value of −5 to 5 nm as indicated in the following Equation 2:

$$R_{in}=(n_x-n_y)\times d \qquad \text{[Equation 1]}$$

$$R_{th}=(n_z-n_y)\times d \qquad \text{[Equation 2]}$$

in Equation 1 and Equation 2, where, $n_x$ is the maximum refractive index in a plane direction of the optical film, $n_y$ is a refractive index in a direction of the optical film perpendicular to the direction of $n_x$, $n_z$ is a refractive index in a thickness direction, and d is a thickness of the film.

15. The optical film of claim 1, characterized in that the optical film is a polarizer protective film.

16. A method of manufacturing an optical film, the method comprising: 1) preparing a blended resin composition including a) an acrylic copolymer resin containing an alkyl methacrylate monomer and a (meth)acrylic monomer containing an alicyclic or an aromatic ring, b) a copolymer resin containing an alkyl methacrylate monomer, an aromatic vinyl monomer, and an acid anhydride monomer, and c) a resin containing an aromatic or an alicyclic ring in a main chain of a polymer; 2) forming a film by using the blended resin composition.

17. The method of claim 16, further comprising uniaxially or biaxially stretching the film after the forming thereof.

18. A liquid crystal display comprising at least one of the optical film according to claim 1.

* * * * *